Mar. 6, 1923.

E. SCHALLER.
ICE MACHINE.
FILED APR. 17, 1918.

1,447,487.

INVENTOR.
ELIZABETH SCHALLER.

Patented Mar. 6, 1923.

1,447,487

UNITED STATES PATENT OFFICE.

ELIZABETH SCHALLER, OF PARIS, FRANCE.

ICE MACHINE.

Application filed April 17, 1918. Serial No. 229,154.

*To all whom it may concern:*

Be it known that ELIZABETH SCHALLER, a citizen of the French Republic, and a resident of Paris, France, has invented certain new and useful Improvements in Ice Machines, of which the following is a specification.

The present invention consists in improvements in ice machines in which use is made of the phenomenon known as the lowering of temperature caused by dissolving in water certain salts such as nitrate of ammonia in order to effect the congelation of the products treated in the ice machines. It is well known that in these apparatus, if it be necessary to prolong the freezing for a somewhat long time, or if only water at a relatively high temperature be available, (above 22° for example), it is necessary to add, during the operation, fresh charges of salt, the dissolving of which prolongs the desired freezing action. Now, if the operation be restricted to the putting of fresh quantities of salt into the machine, the efficacy of the operation is reduced in consequence of the dispersion of the salt in the liquid mass.

The present invention is more particularly applicable to ice machines having a central ice mould or moulds and operating in accordance with the above mentioned process.

The invention consists substantially in placing the supplementary charge of salt employed as a freezing agent in an annular receptacle having small apertures for the admission of the solution, a gap or opening formed in the walls thereof, and provided with means for suspending the receptacle in the freezing apparatus in such manner that the receptacle surrounds the central ice mould. The supplementary salt instead of being immediately dispersed throughout the mass of the solution is slowly dissolved and its action is thus prolonged. The consequence of this is that the same freezing effect can be obtained, in other words a fixed low temperature be maintained during a very long time with small additions of salt. The economy of salt is thus considerable.

Figure 1:
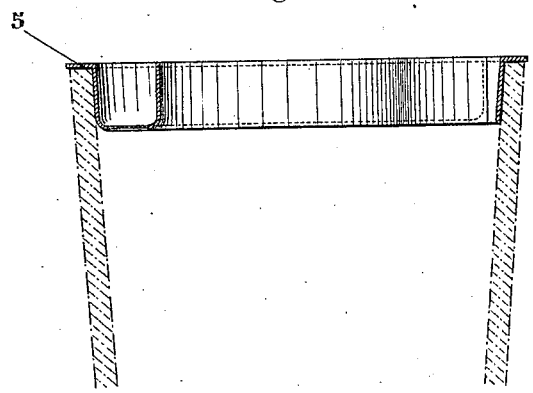
Figure 2:
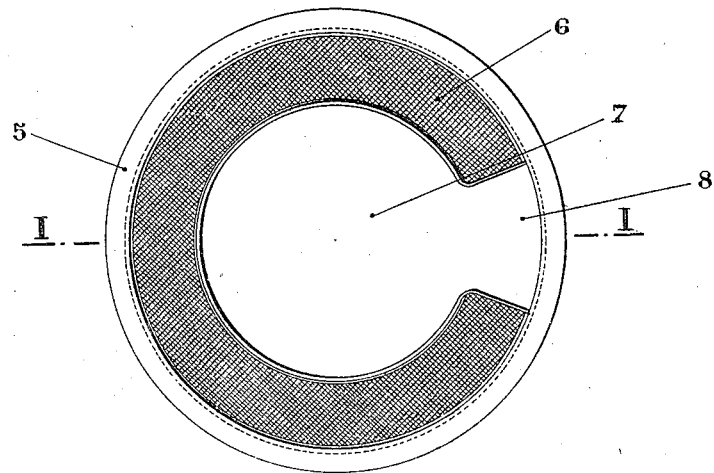

In the accompanying drawing illustration is made of the improved salt receptacle intended for application to a freezing apparatus of the kind set forth;

Fig. 1 being a vertical section of the receptacle taken on the line 1—1 in Fig. 2 and Fig. 2 a plan of the same.

Referring to these figures it will be seen that the supplementary charges of salt are placed in an annular receptacle having a perforated or woven wire bottom 6 through which the solution can have access to the salt and formed with a flange or rim 5 by means of which it is suspended from the upper edge of the tank of the freezer. The central circular opening 7 allows of the insertion of the ice mould into the freezer.

The receptacle is also formed with a gap 8 at one point to enable observation of the contents of the tank to be had without removing the receptacle.

The method of employing the device is as follows:—

The receptacle which has just been described having been placed on the ice-mould or freezer it may be ascertained by means of a spatula introduced through the gap 8 whether any undissolved salt remains on the bottom of the tank. In that case water is added. If all the salt is dissolved a fresh quantity is placed in the annular receptacle and the effect of this fresh charge is to cause a fresh lowering of the temperature and consequently to prolong the effective working of the apparatus.

As has been stated above, the device forming the object of the invention enables the effect of the freezing salt to be increased to some extent and consequently the expenditure of salt to be reduced very considerably in obtaining a particular result. Besides this saving which alone is very important, there is a further saving of fuel employed subsequently for recovering the salt by means of crystallization.

I claim:—

In an ice machine or apparatus in which freezing is effected by dissolving a salt (nitrate of ammonia for example) in water, means for introducing a supplementary charge of salt into the freezing solution for prolonging the freezing action of the apparatus beyond the time when the action of the first charge of salt ceases, said means including an annular salt receptacle with small apertures for the admission of the solution and adapted to surround a central ice-mould and formed with a gap or opening in the walls thereof and means for suspending the receptacle in the freezing apparatus.

In testimony whereof she affixes her signature, in presence of two witnesses.

ELIZABETH SCHALLER.

Witnesses:
    CHAS. P. CROSSBY,
    MIGUEL ZEROLO.